United States Patent [19]
Dodd et al.

[11] Patent Number: 5,313,189
[45] Date of Patent: May 17, 1994

[54] VEHICLE WHEEL SAFETY BARRIER SYSTEM USING PRESSURE AND INFRARED SENSORS

[75] Inventors: Ian Dodd, Rigaud; James Anglehart, Montreal, both of Canada

[73] Assignee: BBI Fibre Technologies, Inc., Quebec, Canada

[21] Appl. No.: 954,529

[22] Filed: Sep. 30, 1992

[51] Int. Cl.⁵ .............................................. B60Q 1/26
[52] U.S. Cl. .................................. 340/433; 340/903; 340/905
[58] Field of Search ............... 340/433, 903, 904, 942, 340/905, 521; 180/281

[56] References Cited

U.S. PATENT DOCUMENTS

| | | | |
|---|---|---|---|
| 4,260,980 | 4/1981 | Bates | 340/904 |
| 4,300,116 | 11/1981 | Stahovec | 340/904 |
| 4,518,183 | 5/1985 | Lee | 293/118 |
| 4,688,656 | 8/1987 | Kent | 180/279 |
| 4,688,824 | 8/1987 | Herring | 280/762 |
| 4,694,295 | 9/1987 | Miller | 340/903 |
| 4,763,939 | 8/1988 | Zhu | 293/17 |
| 4,877,266 | 10/1989 | Lamparter et al. | 280/762 |
| 4,956,630 | 9/1990 | Wicker | 340/433 |
| 4,983,949 | 1/1991 | Wicker | 340/433 |
| 5,042,858 | 8/1991 | Schubert et al. | 293/24 |

FOREIGN PATENT DOCUMENTS 809624 2/1959 United Kingdom .

*Primary Examiner*—Hezron E. Williams
*Assistant Examiner*—Christine K. Oda
*Attorney, Agent, or Firm*—Merchant, Gould, Smith, Edell, Welter & Schmidt

[57] ABSTRACT

The safety barrier system prevents a person from being caught under a wheel of a vehicle and is provided with a sensing system to inform the driver of the presence of the person on the barrier during start up. The sensing system combines a first sensor (for example, a pressure sensor) with an infrared sensor, and includes a snow switch for selectively using the first sensor and/or the infrared sensor depending on the weather conditions. The barrier is mounted to the vehicle by a motor drive mechanism to lower the barrier when stopped and to raise the barrier after the vehicle has travelled a given distance. The system is particularly suitable for school buses.

10 Claims, 8 Drawing Sheets

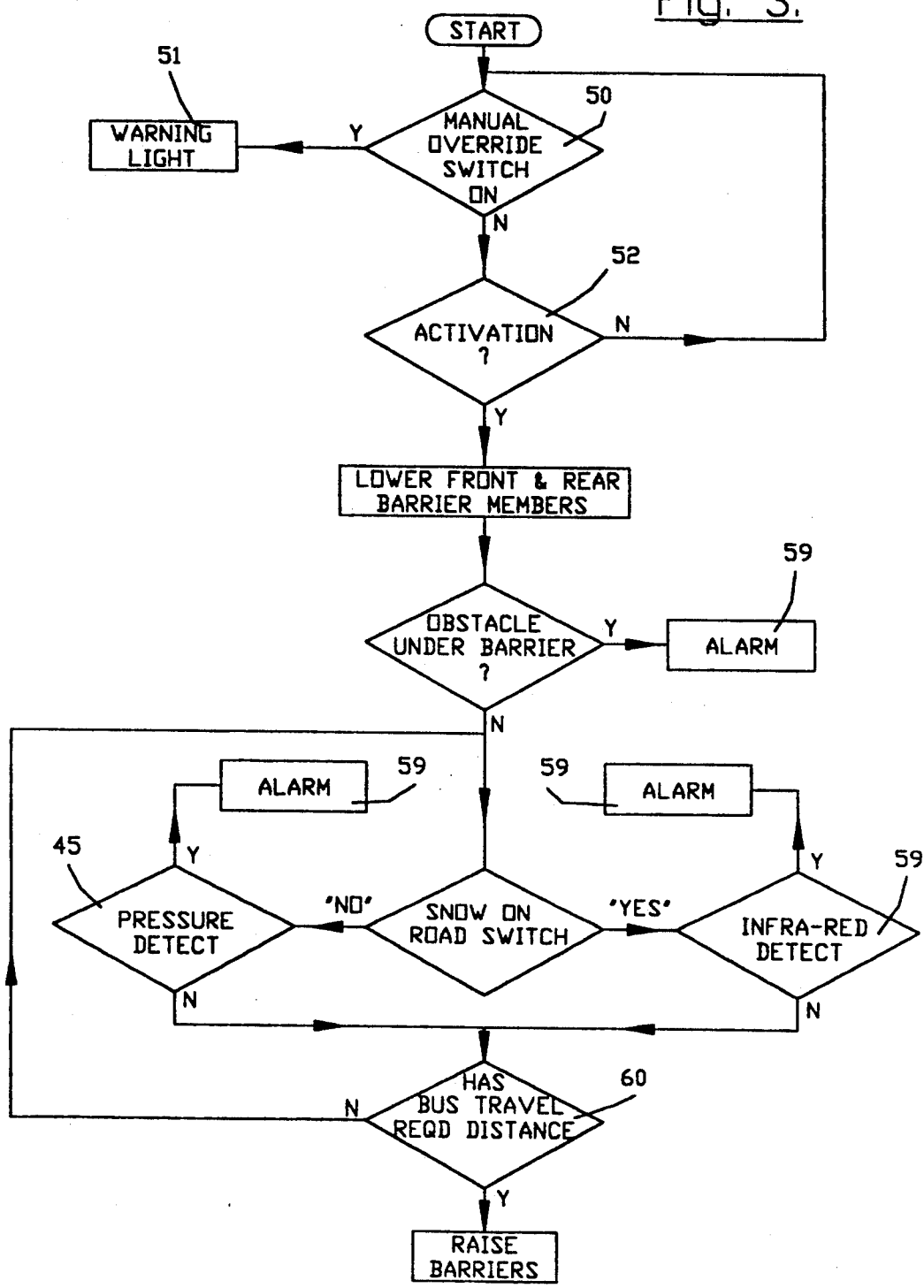

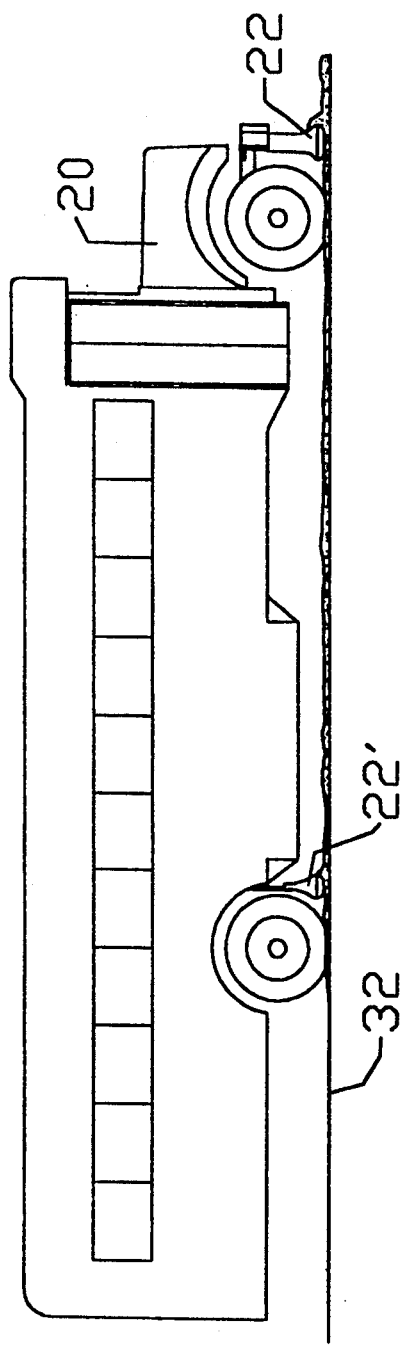

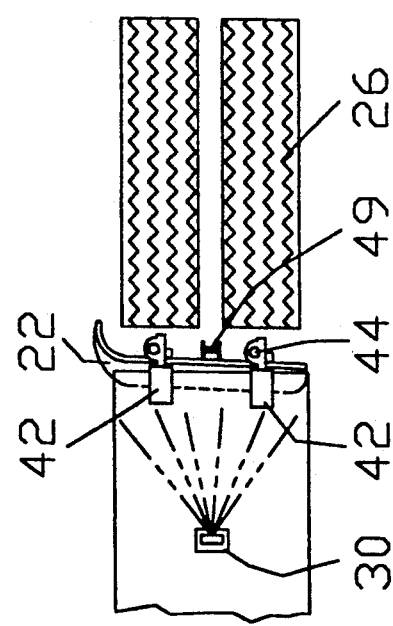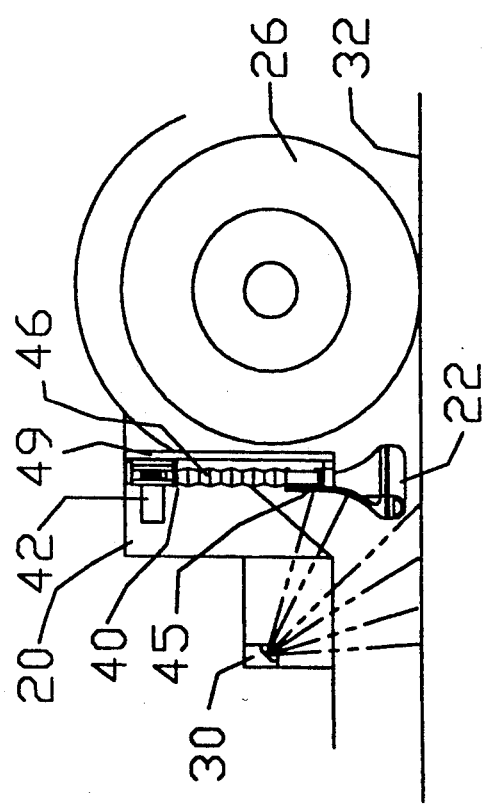

VEHICLE WHEEL SAFETY BARRIER SYSTEM USING PRESSURE AND INFRARED SENSORS

FIELD OF THE INVENTION

The present invention relates to a vehicle wheel barrier system for preventing people from being caught beneath a vehicle wheel and being injured as the vehicle starts up. In particular, the present invention may be applied to school buses to prevent children from being caught by the wheels as the school bus starts up after making a drop off.

BACKGROUND OF THE INVENTION

It is a known problem with school buses that as children are let off after school at the various stops that the school bus makes on its route to drop off children, that bus driver supervision of the children surrounding the bus is particularly difficult to ensure that no children have slipped underneath the bus either accidentally or intentionally. This is particularly difficult since several children may be getting off the bus at the same time and to monitor the movements of all children getting off the bus is virtually impossible, and even with the best mirror systems, there is no guarantee that a child does not slip under the bus and out of the view of the mirror system.

As early as 1959 in British Patent Specification 809,624, it was known to provide safety devices fitting in front of wheels on buses and cars in order to provide a barrier preventing a pedestrian from being caught underneath the wheels of the vehicle. These devices were fixed in nature, and were not particularly practical. U.S. Pat. Nos. 4,688,824 and 4,877,266 are examples of more recent safety devices for school buses which serve to prevent children from being caught under the wheels which are of a more practical construction. U.S. Pat. No. 4,688,656 describes a barrier safety device in which contact with the device activates means for turning off the motor vehicle.

In the prior art systems, no effective combination of a safety barrier and a detecting means to indicate the presence of a person or an object in closed proximity or in contact with the safety barrier has been constructed. It is important for such safety barriers to completely eliminate the possibility that a child or object be caught under the wheels and also to prevent that the child be pushed or dragged.

SUMMARY OF THE INVENTION

It is an object of the present invention to provide a vehicle wheel safety barrier system having a safety barrier and means to detect the presence of a person or child in contact with and/or in close proximity to the safety barrier in order to signal the driver to stop the vehicle. To achieve this object, in all climate conditions, it is an object to provide a vehicle wheel safety barrier system which is able to operate when the roads are clear and hot as well as when the roads are covered with snow. This object is achieved by combining an infrared sensing system able to detect a person's presence near the barrier when snow conditions are prevailing with another sensing system which is able to detect the presence of an object near the barrier more effectively under clear or warm conditions.

It is important to consider that most sensing systems would detect the build up of snow on the safety barrier as contact with the barrier or movement in front of the barrier, since the snow would be detected as an object by the sensing system. For example, ultrasonic or microwave detectors detect snow much as they detect people. Infrared detectors most commonly detect changes in a total amount of infrared radiation received from an optically divided viewing or detection zone. Thus, motion in the zone by an object emitting infrared radiation at a different level than that of the background will cause a change in the total amount of infrared radiation received, and in this way motion is detected.

Infrared sensing systems do not react to the motion of objects having the same infrared emitting characteristics as their background, and the infrared system of the present invention has a chosen sensitivity such that the accumulation of snow on the barrier is not detected as motion in front of the barrier. On the other hand, infrared detection can be easily influenced by temperature variations which are more likely when the ambient temperature is higher or more particularly when the insolation is greater. Thus it is possible to make use of infrared detection under snow conditions when it provides a reliable means of detection, and to make use of other more effective detection means, such as pressure, ultrasound, microwave, and light beam interrupt which measure physical presence of objects independently of the emission characteristics, under clear conditions when such detection means are unaffected by snow.

According to the invention there is provided a vehicle wheel safety barrier system comprising a barrier member for blocking an object from reaching at least one wheel of the vehicle as it is moving; motor mount means for raising and lowering the barrier member, and for connecting the barrier member to a frame of the vehicle; first sensing means for detecting when the object comes in contact with or near the barrier member and for producing an output signal; infrared sensing means for detecting infrared radiation in a zone in front of the barrier member and for producing an output signal; selecting means for providing a climate condition signal indicative of a weather condition outside the vehicle; and means to generate a warning alarm when the barrier member is lowered, as a function of the climate condition signal and the output signals of the first sensing means and the infrared sensing means. In this way, the generating means ignore the output signal of the infrared sensing means under weather conditions unsuitable for infrared radiation detection, and of the first sensing means under weather conditions unsuitable for detection using the first sensing means.

BRIEF DESCRIPTION OF THE DRAWINGS

The invention will now be better understood by way of the following detailed description of a preferred embodiment with reference to the appended drawings in which:

FIG. 3 is a flow chart of the electronic control system according to the preferred embodiment;

FIG. 4 shows a full side view of a school bus equipped with the safety barrier system according to the preferred embodiment travelling on a road surface with snow thereon;

FIG. 7 is a partially cross-section side view of the safety barrier system provided on the rear wheel set of a school bus;

FIG. 8 shows a plan view of the barrier safety system installed at the rear wheels of the bus;

DETAILED DESCRIPTION OF THE PREFERRED EMBODIMENT

Figure 2:
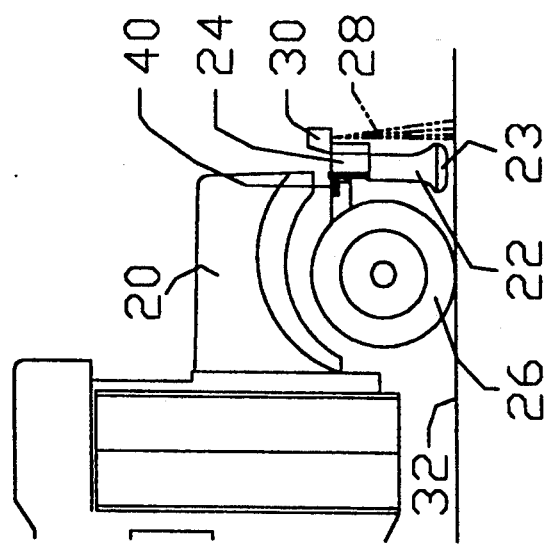
FIG. 2 is a side view of a front portion of a school bus equipped with the safety barrier system according to the preferred embodiment.
Figure 1:
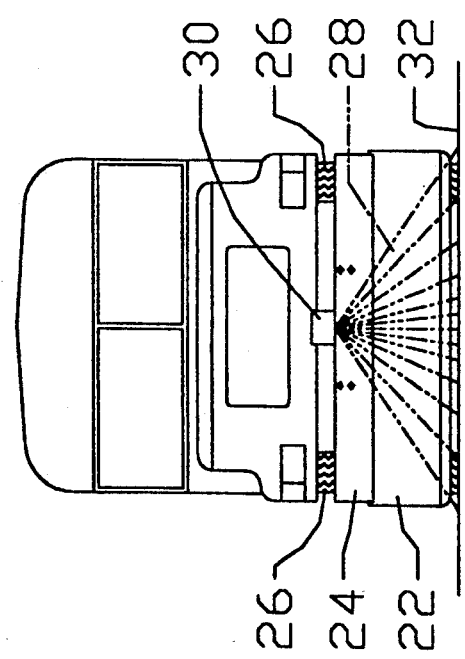
FIG. 1 shows a front view of a school bus equipped with a safety barrier system according to the preferred embodiment.

In the preferred embodiment, the safety barrier system comprises a front vertically movable fiberglass barrier member (22) mounted to the front part of the frame of a school bus (20) (see FIGS. 1 and 2), as well as a rear barrier member (22') mounted to a rear wheel well of the bus (20). (see FIGS. 7 to 10) A flexible plastic or rubber skirt (23) is fitted to the bottom of barriers (22, 22'). At the front of the bus 20, the member 22 is mounted between front bumper 24 and the tires 26.

Motor mount means (40) each comprise a DC electric drive motor (42) for turning a threaded shaft (44) which a nut (43) turns, the nut (43) being connected to the barrier (22, 22'). Upper and lower gaiters (46) cover each upper and lower part of the shaft (44) to protect it from the elements. The nuts (43) are connected to the barriers (22,22') by a spring mount (48) which allows a small amount of resilient ride up of barrier (22,22') on the nuts (45) in case there is a small rock or clump of ice on the road surface (32). If the object under the barrier (22) or (22') is large enough to interfere with descent in spite of the spring mount (48), the motor (42) will 'overload', i.e. it will draw a large current, and as will be described below, the overload is to be detected and a warning alarm will sound. The motor (42) will then go into reverse and thus raises the barrier (22, 22').

The shaft (44) is mounted between motor (42) and a bearing (47) at the bottom of a C-shaped channel member (49) connected to bus (20). Pressure transducers (45) provided inside the barrier (22, 22') are used to generate an electrical signal when an object contacts the barrier. Transducers (45) are preferably passive transducers which convert the pressure or change in pressure on the barrier (22, 22') into an electrically measurable characteristic such as resistance, capacitance or voltage, as is known in the art.

The safety barrier system according to the invention uses an infrared detector means (30) to detect the presence of a person immediately in front of the barriers (22) and (22'). As shown, the infrared detector (30) observes infrared radiation in a 'curtain' 28 the full width of the barrier (22) or (22') and 'sees' only the barrier or object placed very near or on it.

With reference to FIG. 3, the operation of the preferred embodiment will now be described. When the bus is turned on, power is provided to the safety system's electronic controls. A manual override switch (50), which may be part of a keypad command entry system, is provided to allow the bus driver to turn the system off, however, a warning light (51) will remain on while the system is off. Next, the 'snow on road switch' (52) is read to determine its state. Now, once the system is activated, either by manual activation, opening the bus door, stopping for a predetermined time period, or turning on the stop signals of the school bus, the system begins to lower the front and rear barrier members (22) and (22').

The motors (42) are turned on to lower the barriers (22) and (22') for a given time period. If a current overload is detected, it is assumed that there is an object under the barrier (22,22') and the operator is given a warning alarm (57) to check the barrier. The barriers (22, 22') are then raised. Once the timer indicates that the barriers have fully descended, the system uses a distance meter (60) to determine if the bus (20) has travelled a required distance. The required distance may be as little as 6 meters, although 12 meters may be used. The distance meter may be part of the vehicle's odometer.

Until the bus (20) travels the required distance, the system selectively uses the first detecting means (45) (i.e. the pressure sensing means) or the infrared detector means (30) to determine if a person has made contact with the barrier (22,22'), in which case alarm (59) is triggered. In the preferred embodiment, the system uses the infrared detection (30) when the snow switch is on and the pressure detection (45) whenever the switch (50) indicates there is no snow on the road (this is of course controlled by operator input). In this way, false alarms that would be generated by the pressure detection (45) when snow and ice on the road pushes against the barrier (22,22') are eliminated. During snow conditions, the infrared detector (30) works effectively without false alarms being generated by snow being ploughed by the barrier (22,22'). During hot temperatures, and during full insolation, the risk that pockets of warm air rising from the road surface (32) cause false alarms in the infrared detector (30) is eliminated by ignoring the infrared detector (30).

Figure 5:
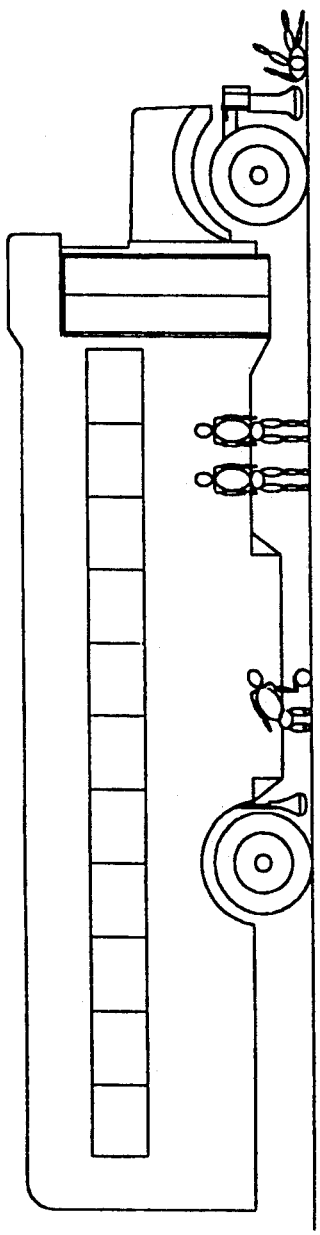
FIG. 5 shows a full side view of a school bus provided with the safety barrier system according to the preferred embodiment with children on the side and in front of the bus.
Figure 6:
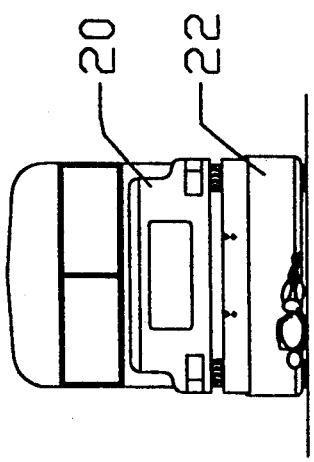
FIG. 6 is a front view of a child being pushed by the safety barrier system at a front of the bus.
Figure 9:
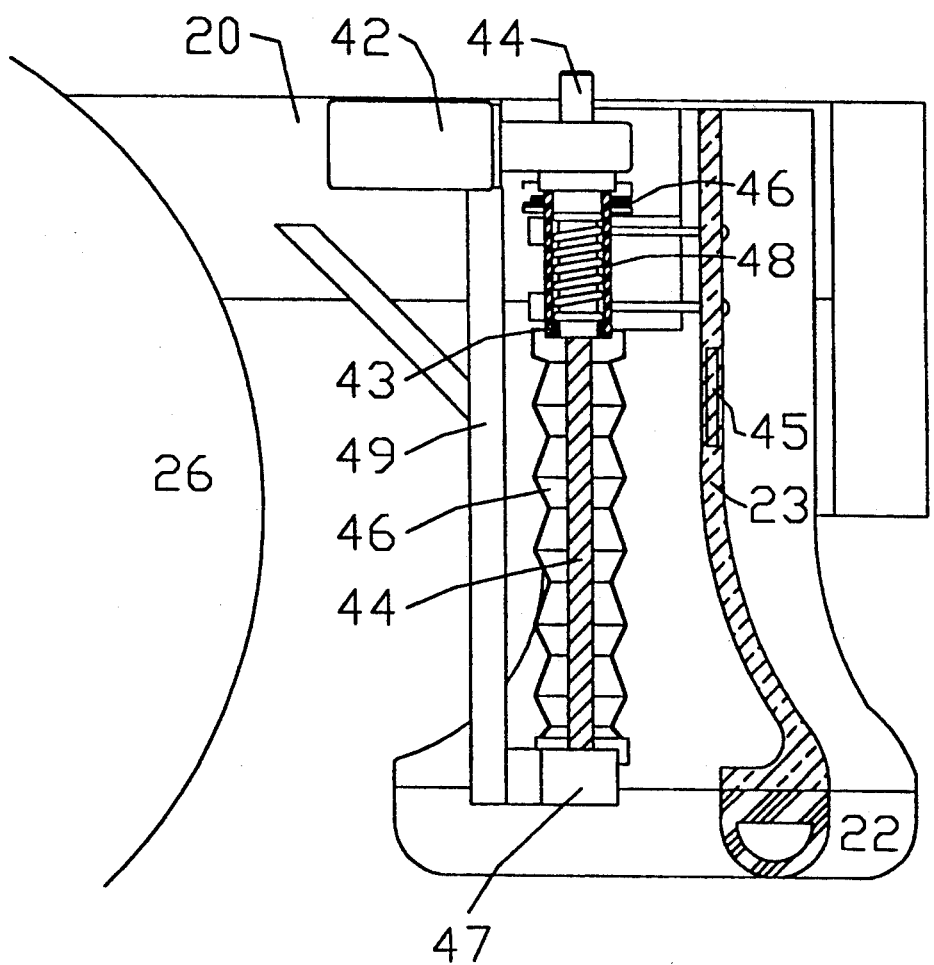
FIG. 9 shows a partly cross-sectional view of the barrier motor mount system in the raised position.
Figure 10:
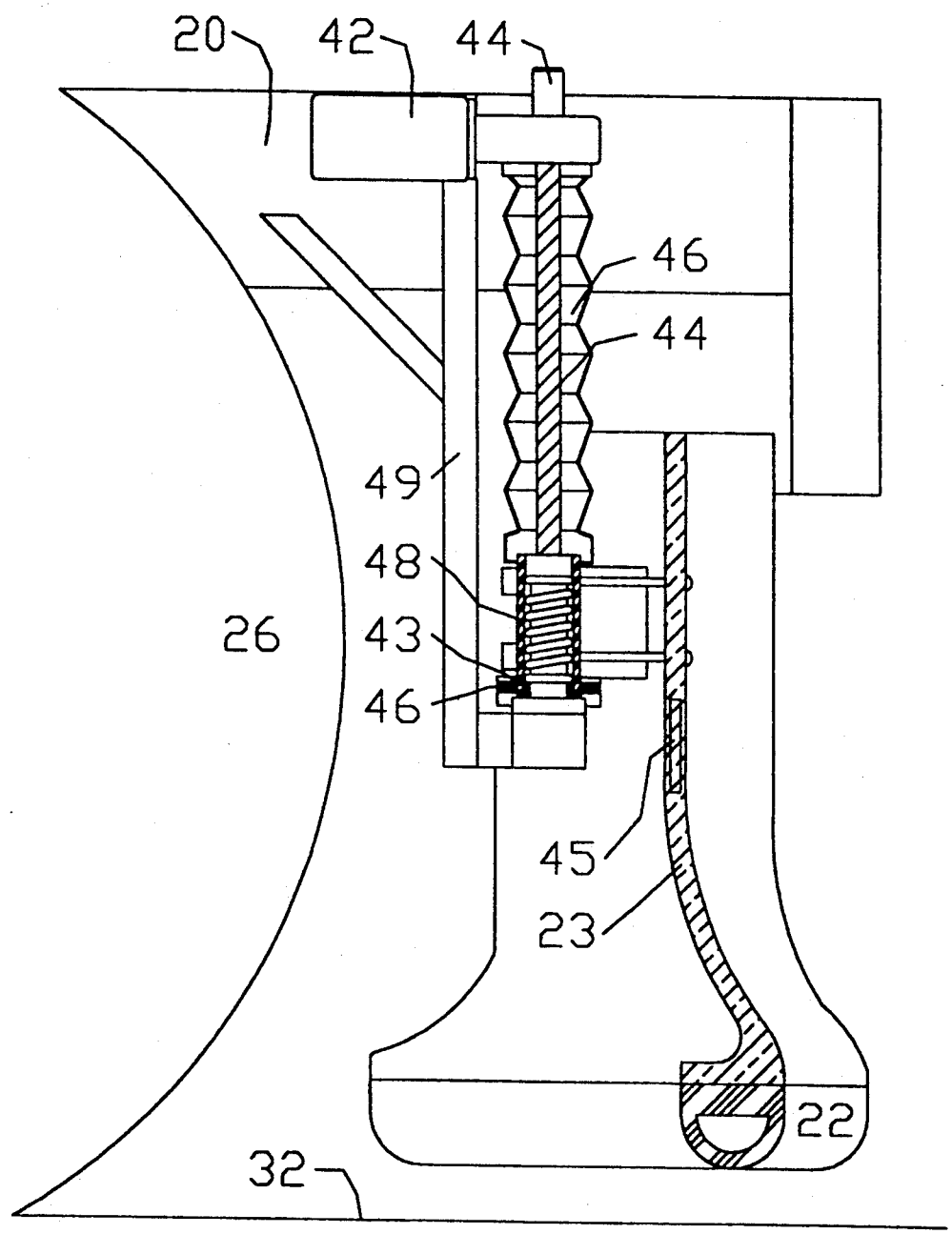
FIG. 10 shows a view similar to FIG. 9 with the barrier lowered.

As shown in FIG. 4, when the road surface (32) is covered with snow the barrier members (22 and 22') will push or plow the snow when the barrier members are lowered and the bus begins to start up. As shown in FIG. 5, children surrounding the bus may be in danger if the child slips in front of the bus or underneath the bus at the side near the rear. Children standing upright at the side of the bus behind the exit doors or on the other side of the bus are in less danger due to the driver's ability to see the children using standard mirrors. As shown in FIG. 6, a child fallen in front of the bus would be pushed by barrier (22) as the bus starts up.

Figure 11:
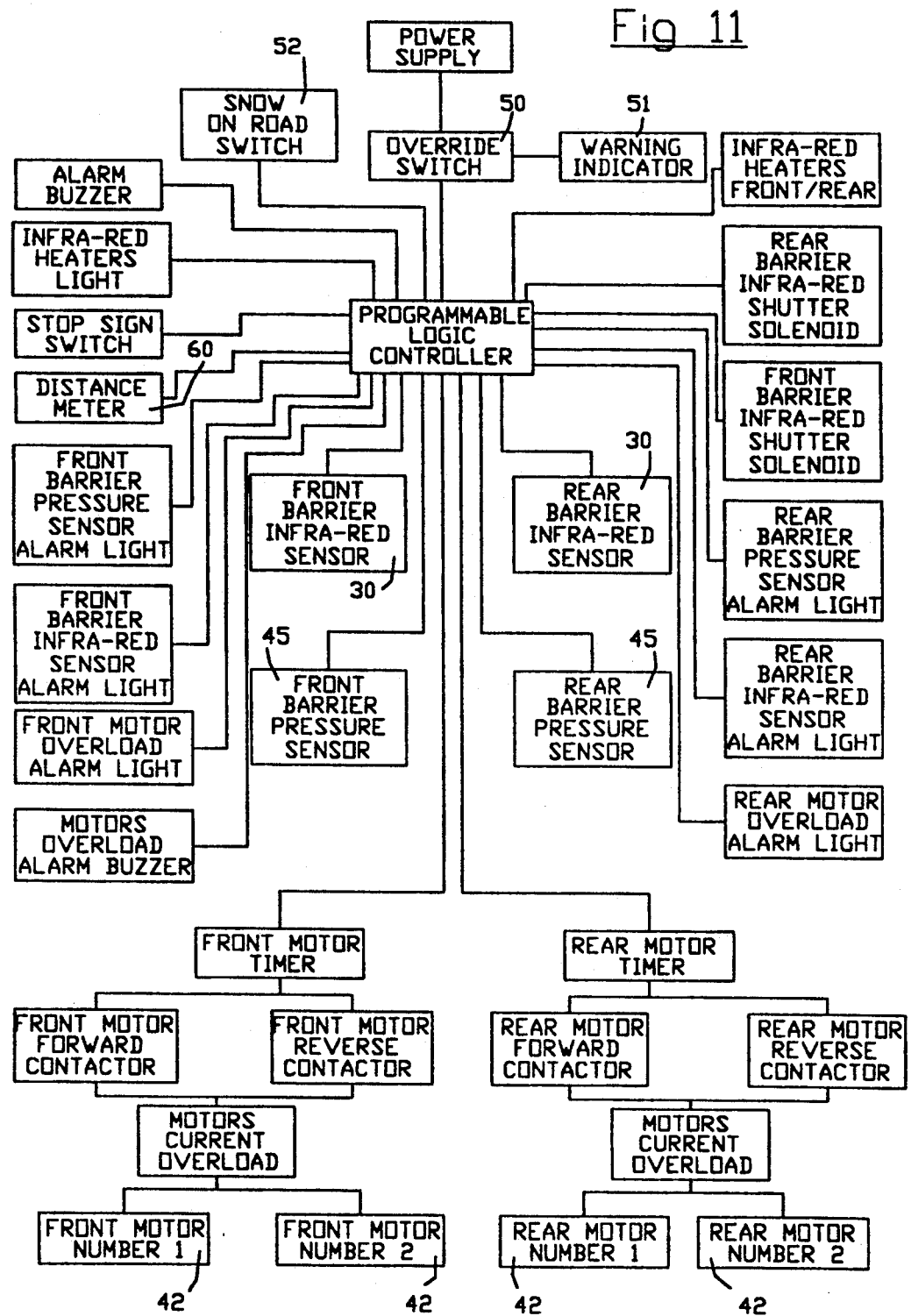
FIG. 11 is a block diagram of the electromechanical system according to the preferred embodiment.

As shown in FIG. 11, the preferred electronic control system uses a programmable logic controller (PLC) for controlling the safety barrier system. The system is activated for example using the stop sign switch which will cause the programmable logic controller to carry out the sequence of steps shown in FIG. 3. In addition to the step shown in FIG. 3, other components are activated as will be described below. The programmable logic controller, and the entire system is shut down if the manual override switch (50) is switched on giving power only to the warning indicator (51). When the override switch is off control is given to the programmable logic controller. The state of the snow on road switch (52) is recorded by the programmable logic controller. When the state of the snow flag is set to YES, the system prepares the infrared detectors (30) by turning on the infrared sensor heaters both at the front and the rear. An infrared heater's light is turned on to show that the heaters are working.

Whenever the stop sign switch is activated, the system signals the front and rear motor timers to activate the front and rear motor forward contactors to lower the front and rear barriers by activating both front and rear motors. If either the front or rear motors draw an excess current, motor current overload sensors provide a signal to the PLC which will signal the appropriate motor timer to reverse the motors until raised. If a current overload is detected, it is assumed that there is an object blocking the descent of the barrier and the motors overload alarm buzzer is activated while either the front or rear motor overload alarm light is turned on in order to request the driver to go outside and check what is blocking the barrier from being lowered. Once the barriers are lowered, and there is snow on the road according to switch (52), the infrared sensor shutters are activated in order to expose the infrared detectors (30) to the field of view in front of barriers (22 and 22'). The shutters provide a means to prevent the lens of the infrared detectors from becoming clouded by dust or soiled water or ice. Should there be then an object detected in front of the barriers by the infrared sensors, the appropriate front or rear barrier infrared sensor alarm light will be turned on along with the alarm buzzer to indicate that a potentially dangerous situation has occurred. In the absence of snow and when the snow on road switch is turned off, the infrared sensor shutters remain closed and the front and rear barrier pressure sensors are read in order to determine if an object has struck one of the barriers (22 or 22'). In such case, the appropriate front or rear barrier pressure sensor alarm light is turned on and the alarm buzzer is also activated. This process of reading the appropriate sensor (30 or 45) depending on the state of the switch (52) continues until distance meter (60) indicates that the appropriate distance has been travelled, at which time the PLC signals the front and rear motor timers to raise the front and rear motors (42) until fully retracted.

Of course, it is possible to replace the various alarm lights and indicator lights illustrated in the block diagram of FIG. 11 by an appropriate display, such as an LCD or LED character display for displaying appropriate messages as set by the PLC (Programmable Logic Controller).

In the preferred embodiment, the first sensing means comprise a pressure transducer (45) provided in the barrier to detect when the barrier (22,22') flexes as a result of being pushed. Of course, pressure can be detected in other ways such as measuring barrier deflection or acoustic coupling and detecting means. The first sensing means may also comprise other detecting means which can work effectively in a given range of climate conditions, such that the combination of the infrared with the first sensing means covers the full range of climate conditions. For example, in the absence of snow, other conventional detection systems may be effectively adapted to work with the safety barrier (22,22'). Ultrasound transceiver systems, microwave transceiver systems, laser beam interrupt systems, are examples of systems which may be adapted to work with the safety barrier (22,22').

In the preferred embodiment, the snow switch (52) causes disabling of the infrared detection (30) when there is no snow. Alternatively, there can be provided a temperature probe to measure the outdoor ambient temperature to disable the infrared system at elevated outdoor temperatures when the detection could become unreliable. In this way, both the first sensing means and the infrared sensing means could operate over a given intermediate range of weather conditions.

What is claimed is:

1. A vehicle wheel safety barrier system comprising:
    a barrier member for blocking an object from reaching at least one wheel of the vehicle as the vehicle is moving;
    motor mount means for raising and lowering the barrier member, and for connecting the barrier member to a frame of the vehicle;
    first sensing means for detecting when an object comes in contact with the barrier member and for producing a first output signal in response to the presence of an object;
    infrared sensing means for detecting infrared radiation in a zone in front of the barrier member and for producing an infrared output signal in response to the presence of an object;
    selecting means for providing a climate condition signal indicative of at least a first and second weather condition outside the vehicle; and
    means for generating a warning alarm when the barrier member is lowered, as a function of the climate condition signal wherein said generating means is responsive to the infrared output signal of the infrared sensing means when the first weather condition is selected and said generating means is responsive to the first sensing means when the second weather condition is selection.

2. The barrier system as claimed in claim 1, wherein said first sensing means is pressure sensing means.

3. The barrier system as claimed in claim 2, wherein said first sensing means comprise a pressure transducer for generating said first output signal in a response to an object contacting said barrier member.

4. The barrier system as claimed in claim 1, wherein the first weather condition comprises the presence of snow proximate the barrier member.

5. The barrier system as claimed in claim 2, wherein the second weather condition comprises the absence of snow proximate the barrier member.

6. The barrier system of claim 1 wherein said generating means is response to the infrared sensing means and the first sensing means when a third weather condition is selected by the selecting means.

7. The barrier system as claimed in claim 1, wherein said motor mount means comprise at least two electric motors each mounted to the frame of the vehicle for driving a pair of threaded shaft, the barrier member connected to said threaded shafts by means of nuts threaded onto said shafts for being raised and lowered by rotation of said shafts, and a gaiter covering each said threaded shaft.

8. The barrier system as claimed in claim 7, wherein a spring connection between said nuts and said barrier member is provided.

9. The barrier system as claimed in claim 7, wherein said first sensing means comprise a pressure transducer for use in generating a signal in response an object contacting said barrier member.

10. The barrier system of claim 1 wherein the selecting means is a switch for manually indicating at least the first and second weather conditions.

* * * * *